US011865752B2

(12) United States Patent
Maruyama (10) Patent No.: US 11,865,752 B2
(45) Date of Patent: Jan. 9, 2024

(54) PLASTICIZING DEVICE, INJECTION MOLDING APPARATUS, AND THREE-DIMENSIONAL SHAPING APPARATUS

(71) Applicant: Seiko Epson Corporation, Tokyo (JP)

(72) Inventor: Hidenobu Maruyama, Azumino (JP)

(73) Assignee: SEIKO EPSON CORPORATION

( * ) Notice: Subject to any disclaimer, the term of this patent is extended or adjusted under 35 U.S.C. 154(b) by 58 days.

(21) Appl. No.: 17/381,494

(22) Filed: Jul. 21, 2021

(65) Prior Publication Data

US 2022/0024092 A1    Jan. 27, 2022

(30) Foreign Application Priority Data

Jul. 22, 2020  (JP) ................................. 2020-125062

(51) Int. Cl.

| | | |
|---|---|---|
| *B29C 45/18* | (2006.01) | |
| *B29C 45/76* | (2006.01) | |
| *B29C 64/393* | (2017.01) | |
| *B29C 64/329* | (2017.01) | |
| *B33Y 30/00* | (2015.01) | |
| *B29C 64/118* | (2017.01) | |

(52) U.S. Cl.
CPC .......... *B29C 45/1808* (2013.01); *B29C 45/76* (2013.01); *B29C 64/329* (2017.08); *B29C 64/393* (2017.08); *B33Y 30/00* (2014.12); *B29C 64/118* (2017.08); *B29C 2045/1875* (2013.01); *B29C 2045/1891* (2013.01); *B29C 2945/76167* (2013.01); *B29C 2945/76183* (2013.01); *B29C 2945/76354* (2013.01); *B29C 2945/76665* (2013.01)

(58) Field of Classification Search
CPC ... B29C 64/329; B29C 64/393; B29C 64/118; B29C 64/336; B29C 45/1808; B29C 45/76; B29C 45/464; B29C 45/54; B29C 45/60; B29C 45/47; B29C 2045/1875; B29C 2045/1891; B29C 2945/76167; B29C 2945/76183; B29C 2945/76354; B29C 2945/76665; B33Y 30/00; B33Y 50/02
USPC ........................................................ 425/145
See application file for complete search history.

(56) References Cited

U.S. PATENT DOCUMENTS

| | | | |
|---|---|---|---|
| 4,579,515 A * | 4/1986 | Kawaguchi | ......... B29C 45/5008 425/149 |
| 2007/0026096 A1* | 2/2007 | Takatsugi | ................ B29C 45/18 425/587 |

(Continued)

FOREIGN PATENT DOCUMENTS

| | | |
|---|---|---|
| JP | H04-307215 A | 10/1992 |
| JP | 2016-002696 A | 1/2016 |

*Primary Examiner* — Joseph S Del Sole
*Assistant Examiner* — Lawrence D. Hohenbrink, Jr.
(74) *Attorney, Agent, or Firm* — Harness, Dickey & Pierce, P.L.C.

(57) ABSTRACT

A plasticizing device includes a passage defining section that is coupled to a hopper which stores a material and that defines a supply passage to which the material is supplied from the hopper, a plasticizing section that includes an introduction portion which communicates with the supply passage, and a screw, and that plasticizes the material supplied from the introduction portion by rotation of the screw to form a molten material, and a material detection section that detects the presence or absence of the material in the supply passage.

16 Claims, 7 Drawing Sheets

(56) References Cited

U.S. PATENT DOCUMENTS

2020/0031037 A1\* 1/2020 Hideshima .............. B29C 45/60
2020/0094480 A1\* 3/2020 Yamasaki ............... B29C 48/02

\* cited by examiner

PLASTICIZING DEVICE, INJECTION MOLDING APPARATUS, AND THREE-DIMENSIONAL SHAPING APPARATUS

The present application is based on, and claims priority from JP Application Serial Number 2020-125062, filed on Jul. 22, 2020, the disclosure of which is hereby incorporated by reference herein in its entirety.

BACKGROUND

1. Technical Field

The present disclosure relates to a plasticizing device, an injection molding apparatus, and a three-dimensional shaping apparatus.

2. Related Art

Heretofore, there has been known an injection molding apparatus configured to supply a material plasticized by a plasticizing device to a cavity formed by a pair of molds and to inject the material from a nozzle.

For example, JP-A-4-307215 (Patent Document 1) describes an injection molding apparatus that includes a detection sensor disposed at a predetermined position in a hopper, and that supplies a predetermined amount of a color change material to the hopper when the sensor detects material shortage after receiving a signal regarding color change conditions.

However, in Patent Document 1, the detection sensor is disposed in the hopper, and therefore, when the material is exchanged, the material remaining between the hopper and the plasticizing section ends up being discarded.

SUMMARY

One aspect of a plasticizing device according to the present disclosure includes a passage defining section that is coupled to a hopper which stores a material and that defines a supply passage to which the material is supplied from the hopper, a plasticizing section that includes an introduction portion which communicates with the supply passage, and a screw, and that plasticizes the material supplied from the introduction portion by rotation of the screw to form a molten material, and a material detection section that detects the presence or absence of the material in the supply passage.

One aspect of an injection molding apparatus according to the present disclosure includes a plasticizing device that plasticizes a material to form a molten material, and a nozzle that injects the molten material supplied from the plasticizing device to a mold, wherein the plasticizing device includes a passage defining section that is coupled to a hopper which stores the material and that defines a supply passage to which the material is supplied from the hopper, a plasticizing section that includes an introduction portion which communicates with the supply passage, and a screw, and that plasticizes the material supplied from the supply passage by rotation of the screw to form the molten material, and a material detection section that detects the presence or absence of the material in the supply passage.

One aspect of a three-dimensional shaping apparatus according to the present disclosure is a three-dimensional shaping apparatus that shapes a three-dimensional shaped article, and includes a plasticizing device that plasticizes a material to form a molten material, and a nozzle that ejects the molten material supplied from the plasticizing device to a stage, wherein the plasticizing device includes a passage defining section that is coupled to a hopper which stores the material and that defines a supply passage to which the material is supplied from the hopper, a plasticizing section that includes an introduction portion which communicates with the supply passage, and a screw, and that plasticizes the material supplied from the supply passage by rotation of the screw to form the molten material, and a material detection section that detects the presence or absence of the material in the supply passage.

DESCRIPTION OF EXEMPLARY EMBODIMENTS

Hereinafter, preferred embodiments of the present disclosure will be described in detail using the drawings. Note that the embodiments described below are not intended to unduly limit the contents of the present disclosure described in the claims. Further, all the configurations described below are not necessarily essential configuration requirements of the present disclosure.

1. Injection Molding Apparatus
1.1. Overall Configuration

Figure 1:
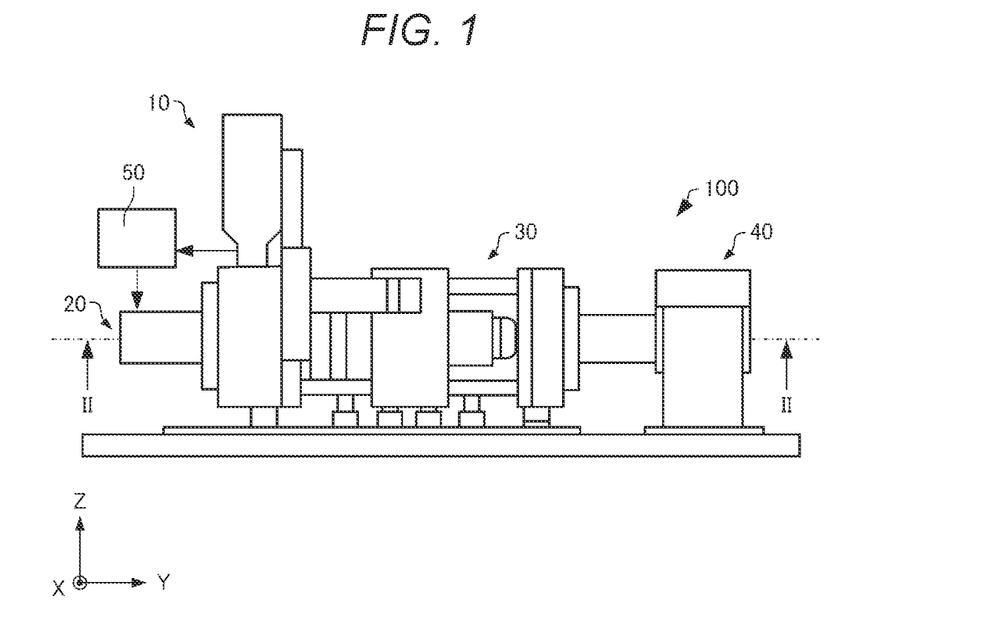
FIG. 1 is a side view schematically showing an injection molding apparatus according to the present embodiment.

First, an injection molding apparatus according to the present embodiment will be described with reference to the drawings. FIG. 1 is a side view schematically showing an injection molding apparatus 100 according to the present embodiment. Note that in FIG. 1, as three axes orthogonal to one another, X axis, Y axis, and Z axis are shown. An X-axis direction and a Y-axis direction are each, for example, a horizontal direction. A Z-axis direction is, for example, a vertical direction.

The injection molding apparatus 100 includes a hopper 10, an injection section 20, a mold section 30, and a mold clamping section 40 as shown in FIG. 1.

The hopper 10 stores a material in the injection section 20. In the hopper 10, a material in a pellet form or a powder form is stored. As the material to be stored in the hopper 10, for example, an ABS (acrylonitrile butadiene styrene) resin in a pellet form is exemplified.

The injection section 20 plasticizes the material supplied from the hopper 10 to form a molten material. Then, the injection section 20 injects the molten material to the mold section 30.

Note that the "plasticization" is a concept including melting, and is to transform a material from a solid state to a state having fluidity. Specifically, in the case of a material in which glass transition occurs, the "plasticization" is to raise the temperature of the material to a temperature equal to or higher than the glass transition point. In the case of a material in which glass transition does not occur, the "plasticization" is to raise the temperature of the material to a temperature equal to or higher than the melting point.

In the mold section 30, a cavity corresponding to the shape of a molded article is formed. The molten material injected from the injection section 20 flows into the cavity. Then, the molten material is cooled and solidified, whereby a molded article is formed.

The mold clamping section 40 opens and closes the mold section 30. The mold clamping section 40 opens the mold section 30 after the molten material is cooled and solidified. By doing this, the molded article is discharged to the outside.

1.2. Specific Configuration

Figure 2:
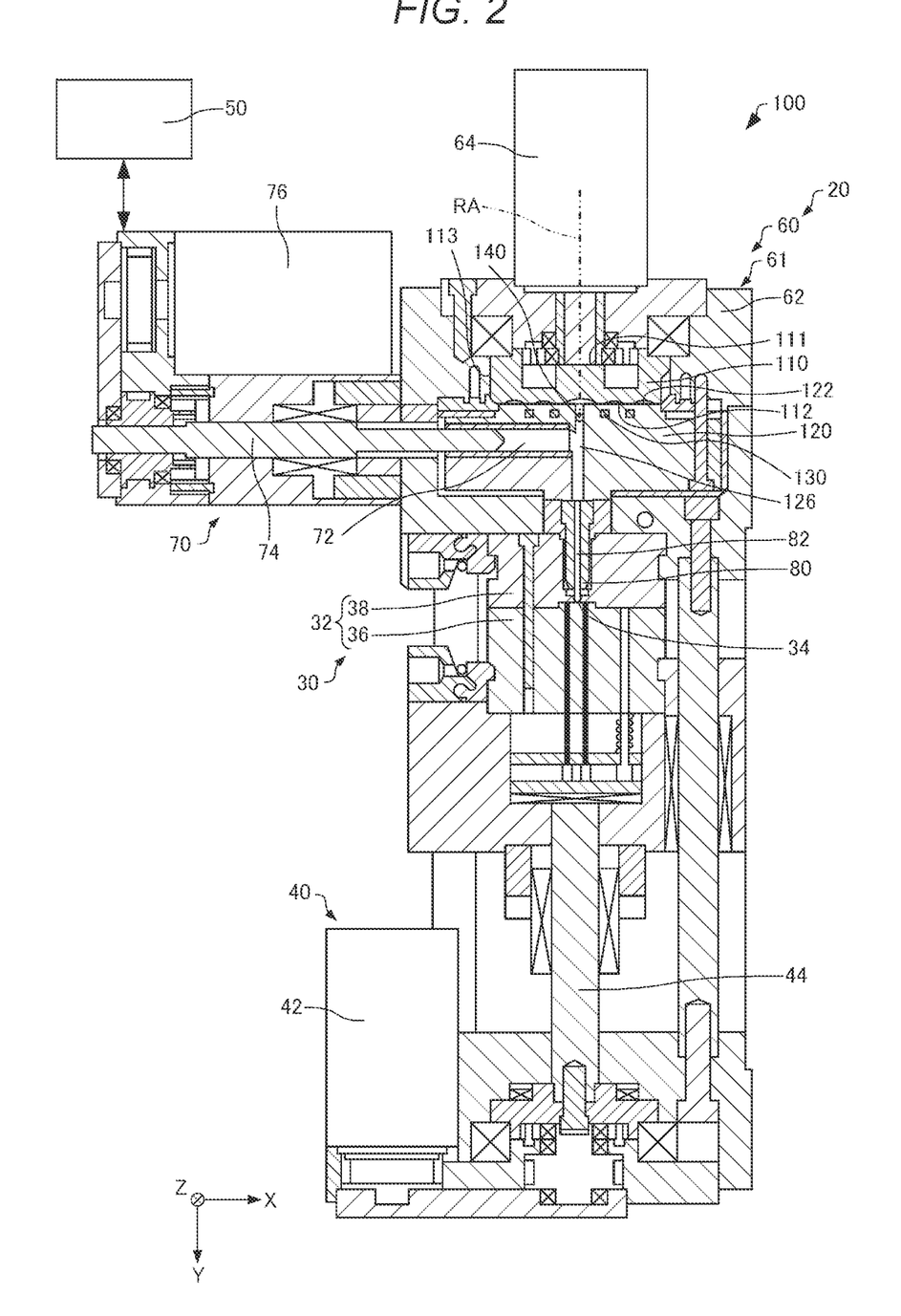
FIG. 2 is a cross-sectional view schematically showing the injection molding apparatus according to the present embodiment.

FIG. 2 is a cross-sectional view taken along the line II-II of FIG. 1 schematically showing the injection molding apparatus 100. In FIG. 2, the injection section 20, the mold section 30, and the mold clamping section 40 are shown. The injection section 20 includes, for example, a plasticizing device 60 including a control unit 50 and a plasticizing section 61, an injection control unit 70, and a nozzle 80 as shown in FIG. 2.

The control unit 50 is constituted by, for example, a computer including a processor, a main storage device, and an input/output interface for performing signal input/output to/from the outside. The control unit 50, for example, exhibits various functions by execution of a program read in the main storage device by the processor. Specifically, the control unit 50 controls the mold clamping section 40 and the plasticizing section 61. The control unit 50 may be constituted not by a computer, but by a combination of a plurality of circuits.

The plasticizing section 61 plasticizes a material supplied from the hopper 10 to form a molten material in a paste form having fluidity and guides the molten material to the injection control unit 70. The plasticizing section 61 includes, for example, a screw case 62, a drive motor 64, a flat screw 110, a barrel 120, a heating section 130, and a check valve 140.

The screw case 62 is a housing that houses the flat screw 110. The flat screw 110 is housed in a space surrounded by the screw case 62 and the barrel 120.

The drive motor 64 is provided at an upper face of the screw case 62. The drive motor 64 rotates the flat screw 110. The drive motor 64 is controlled by the control unit 50.

Figure 3:
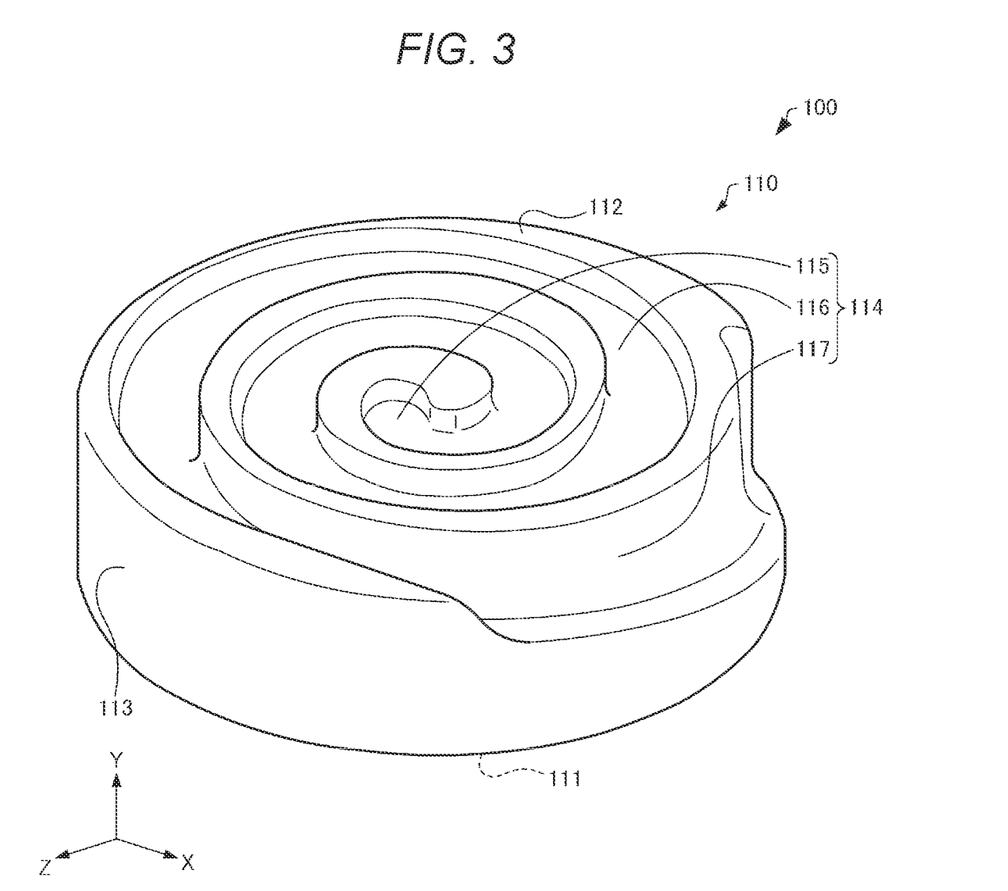
FIG. 3 is a perspective view schematically showing a flat screw of the injection molding apparatus according to the present embodiment.

The flat screw 110 has a substantially columnar shape in which a size in a direction of a rotational axis RA is smaller than a size in a direction orthogonal to the direction of the rotational axis RA. In the illustrated example, the rotational axis RA is parallel to the Y axis. The flat screw 110 is rotated around the rotational axis RA by a torque generated by the drive motor 64. The plasticizing section 61 plasticizes the material supplied from the hopper 10 by the rotation of the flat screw 110. The flat screw 110 has an upper face 111, a grooved face 112 at an opposite side to the upper face 111, and a side face 113 that couples the upper face 111 to the grooved face 112. Here, FIG. 3 is a perspective view schematically showing the flat screw 110. Note that in FIG. 3, a state in which the up-and-down positional relationship is reversed to that of the state shown in FIG. 2 is shown for the sake of convenience. Further, in FIG. 2, the flat screw 110 is shown in a simplified manner.

The grooved face 112 of the flat screw 110 is provided with a first groove 114 as shown in FIG. 3. The first groove 114 includes, for example, a central portion 115, a groove coupling portion 116, and a material introduction portion 117. The central portion 115 is opposed to a communication hole 126 provided in the barrel 120. The central portion 115 communicates with the communication hole 126. The groove coupling portion 116 couples the central portion 115 to the material introduction portion 117. In the illustrated example, the groove coupling portion 116 is provided in a spiral shape from the central portion 115 toward the outer circumference of the grooved face 112. The material introduction portion 117 is provided at the outer circumference of the grooved face 112. That is, the material introduction portion 117 is provided at the side face 113 of the flat screw 110. The material supplied from the hopper 10 is introduced into the first groove 114 from the material introduction portion 117 and passes through the groove coupling portion 116 and the central portion 115, and is conveyed to the communication hole 126 provided in the barrel 120. The number of first grooves 114 is not particularly limited, and two or more first grooves 114 may be provided.

Figure 4:
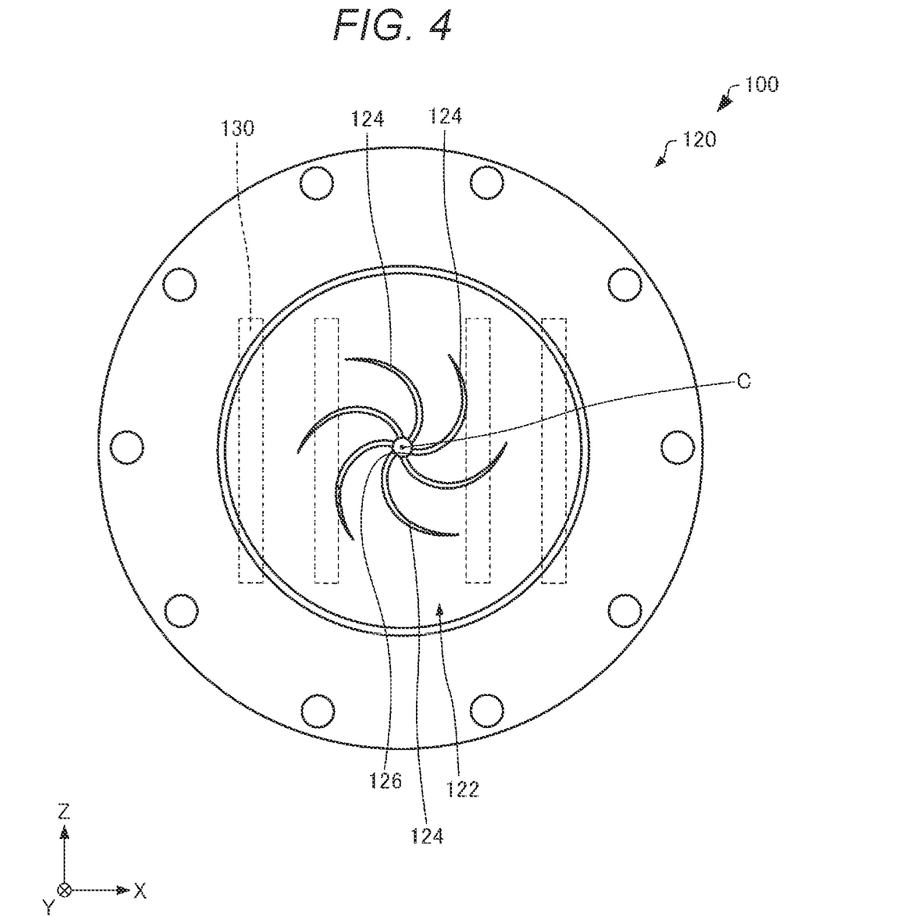
FIG. 4 is a plan view schematically showing a barrel of the injection molding apparatus according to the present embodiment.

The barrel 120 is provided below the flat screw 110 as shown in FIG. 2. The barrel 120 has an opposed face 122 opposed to the grooved face 112 of the flat screw 110. At the center of the opposed face 122, the communication hole 126 is provided. Here, FIG. 4 is a plan view schematically showing the barrel 120. Note that in FIG. 2, the barrel 120 is shown in a simplified manner for the sake of convenience.

In the opposed face 122 of the barrel 120, a second groove 124 and the communication hole 126 are provided as shown in FIG. 4. As the second groove 124, a plurality of grooves are provided. In the illustrated example, six second grooves 124 are provided, but the number thereof is not particularly limited. The plurality of second grooves 124 are provided around the communication hole 126 when viewed from the Y-axis direction. One end of the second groove 124 is coupled to the communication hole 126, and the second groove 124 extends in a spiral shape from the communication hole 126 toward the outer circumference of the opposed face 122. The second groove 124 has a function of guiding the molten material to the communication hole 126.

The shape of the second groove 124 is not particularly limited, and may be, for example, a linear shape. Further, the second groove 124 need not be provided in the opposed face 122. However, when taking into consideration that the molten material is effectively guided to the communication hole 126, it is preferred to provide the second groove 124 in the opposed face 122.

The heating section 130 heats the material supplied between the flat screw 110 and the barrel 120. The heating section 130 is provided, for example, in the barrel 120. In the illustrate example, the heating section 130 is constituted by four heaters provided in the barrel 120. The output of the heating section 130 is controlled by the control unit 50. The plasticizing section 61 heats the material while conveying the material to the communication hole 126 to form a molten material, and the formed molten material is allowed to flow out from the communication hole 126 to the injection control unit 70 by the flat screw 110, the barrel 120, and the heating section 130.

The check valve 140 is provided in the communication hole 126 as shown in FIG. 2. The check valve 140 suppresses backflow of the molten material from the communication hole 126 to the first groove 114 provided in the flat screw 110.

The injection control unit 70 includes, for example, a cylinder 72, a plunger 74, and a plunger driving section 76. The cylinder 72 is a member in a substantially cylindrical shape coupled to the communication hole 126. The plunger 74 moves inside the cylinder 72. The plunger 74 is driven by the plunger driving section 76 constituted by a motor, a gear, or the like. The plunger driving section 76 is controlled by the control unit 50.

The injection control unit 70 executes a measuring operation and an injection operation by sliding the plunger 74 in the cylinder 72. The measuring operation refers to an operation of measuring the molten material in the cylinder 72 by moving the plunger 74 to the −X-axis direction away from the communication hole 126 so as to guide the molten material located in the communication hole 126 to the inside of the cylinder 72. The injection operation refers to an operation of injecting the molten material in the cylinder 72 to the mold section 30 through the nozzle 80 by moving the plunger 74 to the +X-axis direction approaching the communication hole 126.

In the nozzle 80, a nozzle hole 82 that communicates with the communication hole 126 is provided. From the nozzle hole 82, the molten material supplied from the plasticizing section 61 is injected to a molding die 32 of the mold section 30. Specifically, by executing the measuring operation and the injection operation described above, the molten material measured in the cylinder 72 is sent to the nozzle hole 82 through the communication hole 126 from the injection control unit 70. Then, the molten material is injected to the mold section 30 from the nozzle hole 82.

The mold section 30 includes the molding die 32. The molding die 32 is a mold. The molten material sent to the nozzle hole 82 is injected to a cavity 34 of the molding die 32 from the nozzle hole 82. Specifically, the molding die 32 includes a movable die 36 and a fixed die 38 opposed to each other, and has a cavity 34 between the movable die and the fixed die 38. The cavity 34 is a space corresponding to the shape of a molded article. The material of the movable die 36 and the fixed die 38 is a metal. The material of the movable die 36 and the fixed die 38 may be a ceramic or a resin.

The mold clamping section 40 includes, for example, a mold driving section 42 and a ball screw section 44. The mold driving section 42 is constituted by, for example, a motor, a gear, or the like. The mold driving section 42 is coupled to the movable die 36 through the ball screw section 44. The driving of the mold driving section 42 is controlled by the control unit 50. The ball screw section 44 transmits a power generated by driving of the mold driving section 42 to the movable die 36. The mold clamping section 40 opens and closes the mold section 30 by moving the movable die 36 using the mold driving section 42 and the ball screw section 44.

1.3. Passage Defining Section and Material Detection Section

Figure 5:
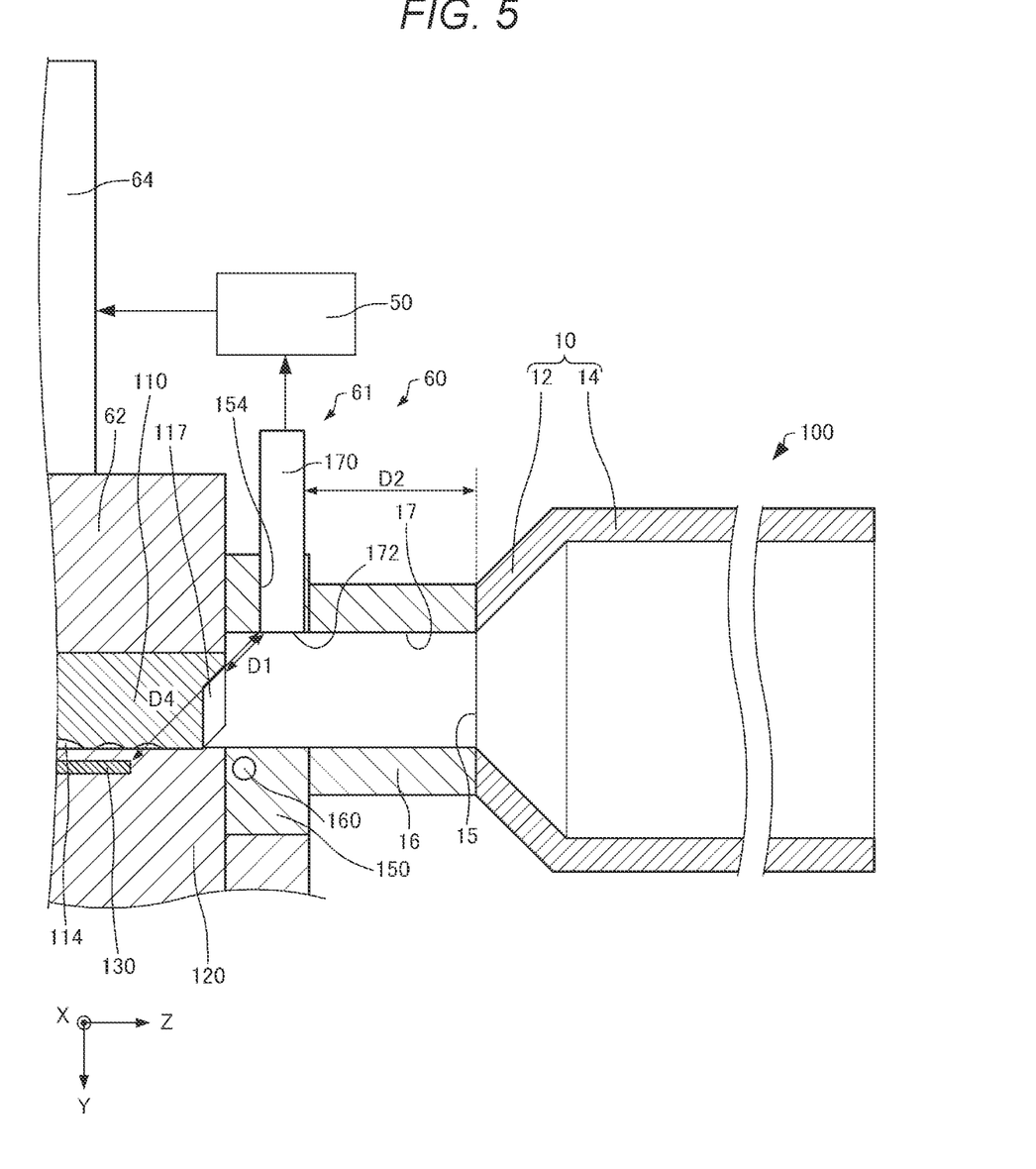
FIG. 5 is a cross-sectional view schematically showing the injection molding apparatus according to the present embodiment.

FIG. 5 is a cross-sectional view schematically showing the injection molding apparatus 100, and is a cross-sectional view when the injection molding apparatus 100 shown in FIG. 1 is cut along a plane parallel to the YZ-plane including the Y axis and the Z axis. The plasticizing device 60 includes a passage defining section 150, a cooling section 160, and a material detection section 170 as shown in FIG. 5. Note that in FIG. 5, the plasticizing device 60 is shown in a simplified manner for the sake of convenience.

The passage defining section 150 is coupled to the hopper 10 that stores the material through a hopper coupling pipe 16. In the illustrated example, the hopper 10 is constituted by a tapered portion 12 whose size in the Y-axis direction gradually increases toward the +Z-axis direction, and a constant width portion 14, which is coupled to the tapered portion 12, and whose size in the Y-axis direction is constant. The constant width portion 14 has an outlet 15 from which the material in the hopper 10 is sent to the hopper coupling pipe 16. The passage defining section 150 may be provided integrally with the hopper coupling pipe 16.

The passage defining section 150 couples the hopper 10 to the plasticizing section 61 through the hopper coupling pipe 16. The passage defining section 150 defines a supply passage 152 to which the material is supplied from the hopper 10. In the illustrated example, the size in the Y-axis direction of the supply passage 152 and the size in the Y-axis direction of a hollow portion 17 of the hopper coupling pipe 16 are the same. The size in the Y-axis direction of the passage defining section 150 is larger than the size in the Y-axis direction of the hopper coupling pipe 16. The passage defining section 150 may be provided integrally with the screw case 62. In that case, the supply passage 152 can be said to be provided in the screw case 62, and the passage defining section 150 can be said to be the screw case 62.

The supply passage 152 communicates with the material introduction portion 117 of the first groove 114 provided in the flat screw 110 of the plasticizing section 61. The supply passage 152 communicates with the communication hole 126 provided in the barrel 120 through the first groove 114. The material stored in the hopper 10 is supplied to the first groove 114 through the supply passage 152.

Figure 6:
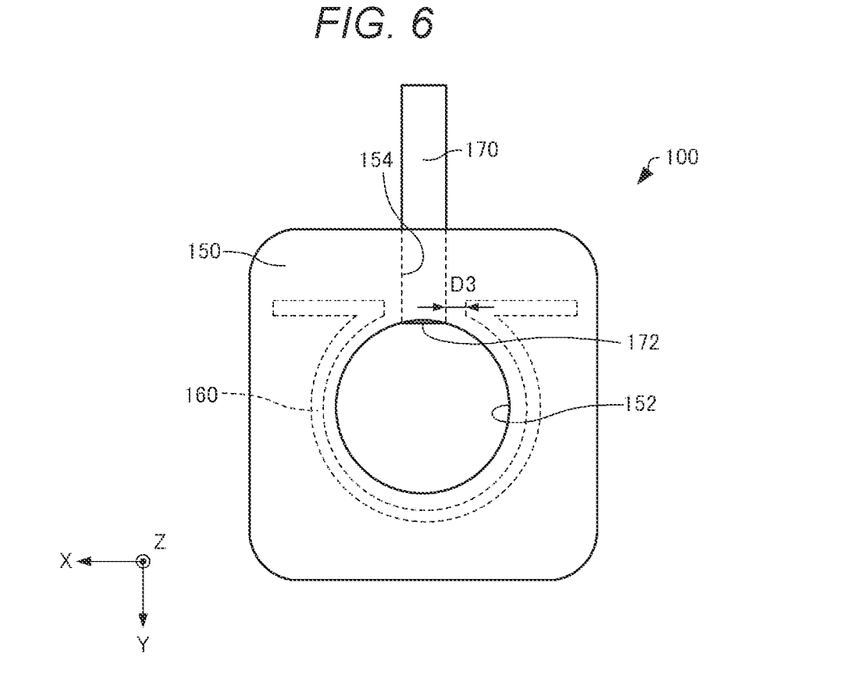
FIG. 6 is a view schematically showing a supply pipe of the injection molding apparatus according to the present embodiment.

The passage defining section 150 supports the material detection section 170. Here, FIG. 6 is a view schematically showing the passage defining section 150. In the passage defining section 150, for example, a communication hole 154 that communicates with the supply passage 152 is provided as shown in FIGS. 5 and 6. The material detection section 170 is inserted into the communication hole 154 and fixed to the passage defining section 150.

The cooling section 160 is provided in the passage defining section 150. As described above, the passage defining section 150 may be provided integrally with the screw case 62, and in that case, the cooling section 160 can be said to be provided in the screw case 62. The cooling section 160 cools the outer circumference of at least one of the flat screw 110 and the barrel 120. That is, the cooling section 160 may cool both the flat screw 110 and the barrel 120 or may cool one of the flat screw 110 and the barrel 120.

The cooling section 160 is provided so as to surround the supply passage 152 while avoiding the material detection section 170 as shown in FIG. 6. Therefore, a possibility that the material detection section 170 breaks down due to the heat of the heating section 130 can be reduced. The cooling section 160 is, for example, a cooling pipe through which a coolant such as water flows. The cooling section 160 is, for example, coupled to a circulation device for conveying the coolant or a cooling device for cooling the coolant through an unillustrated cooling pipe.

The cooling section 160 and the heating section 130 form a temperature gradient such that the temperature increases from the outer circumference of the barrel 120 to the communication hole 126. By such a temperature gradient, the material can be efficiently supplied to the central portion 115 from the material introduction portion 117 of the flat screw 110. For example, when the temperature of the outer circumference of the barrel is too high, the material is melted when the material is introduced into the material introduction portion and the material may sometimes leak to the outside.

The material detection section 170 is supported by the passage defining section 150 as shown in FIG. 5. The shortest distance D1 between the material detection section 170 and the material introduction portion 117 of the first groove 114 is smaller than the shortest distance D2 between the material detection section 170 and the outlet 15 of the hopper 10. A tip 172 of the material detection section 170 is exposed to the supply passage 152. As shown in FIG. 6, the supply passage 152 is located between the material detection section 170 and the cooling section 160. As shown in FIG. 5, when viewed from a cross section, the material detection section 170, the supply passage 152, and the cooling section 160 are arranged in this order from the top. In the illustrated example, the "cross section" is a cross section when the plasticizing device 60 is cut along a plane parallel to the YZ-plane, and the material detection section 170, the supply passage 152, and the cooling section 160 are arranged in this order in the +Y-axis direction. The +Y-axis direction is, for example, a direction at which the molten material is ejected.

The material detection section 170 is provided at a position closer to the cooling section 160 than to the heating section 130 as shown in FIG. 5. That is, the shortest distance D3 between the material detection section 170 and the cooling section 160 shown in FIG. 6 is smaller than the shortest distance D4 between the material detection section 170 and the heating section 130 shown in FIG. 5. When viewed from the Y-axis direction, the heating section 130, the cooling section 160, and the material detection section 170 are arranged in this order from the center C of the barrel 120 to the outside. In the example shown in FIG. 5, the cooling section 160 is located at a more positive side in the Z-axis direction than the heating section 130, and the material detection section 170 is located at a more positive side in the Z-axis direction than the cooling section 160.

The material detection section 170 detects the presence or absence of the material in the supply passage 152. The material detection section 170 is, for example, a proximity sensor such as a high frequency inductive proximity sensor or an electrostatic capacity proximity sensor.

When the material detection section 170 detects material shortage, the control unit 50 receives a signal from the material detection section 170 and controls the flat screw 110 via the drive motor 64 so as to stop the rotation of the flat screw 110 after a preset purging time has elapsed. Further, when the material detection section 170 detects material shortage, the control unit 50 receives a signal from the material detection section 170 and controls the plunger driving section 76 and the mold driving section 42 so as to stop the driving of the plunger 74 and the movement of the movable die 36 after a preset purging time has elapsed. Note that the purging time is a time for throwing out the material remaining in the first groove 114 provided in the flat screw 110 or the material remaining in the communication hole 126 provided in the barrel 120 when the material is exchanged.

Even if the material detection section 170 detects material shortage, the control unit 50 does not stop the driving of the heating section 130. If the driving of the heating section 130 is stopped when the material detection section 170 detects material shortage, for example, the material is solidified in the communication hole 126 provided in the barrel 120, and it takes time to restore the material.

1.4. Operational Effects

The plasticizing device 60 includes the passage defining section 150 that is coupled to the hopper 10 which stores a material and that defines the supply passage 152 to which the material is supplied from the hopper 10, the plasticizing section 61 that includes the material introduction portion 117 which communicates with the supply passage 152, and the flat screw 110, and that plasticizes the material supplied from the material introduction portion 117 by rotation of the flat screw 110 to form a molten material, and the material detection section 170 that detects the presence or absence of the material in the supply passage 152. Therefore, as compared with the case where the material detection section detects the presence or absence of the material in the hopper, the amount of the material remaining in the supply passage 152 can be reduced when the material is exchanged. Therefore, the amount of the material to be discarded can be reduced. Further, in the plasticizing device 60, the material detection section 170 is provided in the passage defining section 150, and therefore, the structure of the plasticizing section 61 can be simplified.

In the plasticizing device 60, the control unit 50 is included, and when the material detection section 170 detects material shortage, the control unit 50 stops the rotation of the flat screw 110. Therefore, in the plasticizing device 60, failure due to a short shot and breakage of the device due to no-load running can be prevented.

In the plasticizing device 60, the flat screw 110 has the grooved face 112 provided with the first groove 114, and the plasticizing section 61 includes the barrel 120 that has the opposed face 122 opposed to the grooved face 112 and that is provided with the communication hole 126 at the opposed face 122. Therefore, in the plasticizing device 60, the material can be supplied to the first groove 114 from the supply passage 152.

In the plasticizing device 60, the plasticizing section 61 includes the heating section 130 that heats the material supplied between the flat screw 110 and the barrel 120, and the cooling section 160 that cools the outer circumference of at least one of the flat screw 110 and the barrel 120, and the material detection section 170 is provided at a position closer to the cooling section 160 than to the heating section 130. Therefore, in the plasticizing device 60, as compared with the case where the material detection section is provided at a position closer to the heating section than to the cooling section, a possibility that the material detection section 170 breaks down due to the heat of the heating section 130 can be reduced.

In the plasticizing device 60, the passage defining section 150 may be the screw case 62 that houses the flat screw 110, and the heating section 130 is provided in the barrel 120, the cooling section 160 is provided in the screw case 62, and when viewed from a cross section, the material detection section 170, the supply passage 152, and the cooling section 160 are arranged in this order from the top. Therefore, in the plasticizing device 60, as compared with the case where the material detection section, the supply passage, and the cooling section are not arranged in this order, a possibility that the material in the supply passage 152 is melted by the heat of the heating section 130 can be reduced. When the material in the supply passage is melted, the material cannot be efficiently guided to the communication hole provided in the barrel.

In the plasticizing device 60, when viewed from a direction perpendicular to the grooved face 112, the heating section 130, the cooling section 160, and the material detection section 170 are provided in this order from the center C of the barrel 120 to the outside. Therefore, in the plasticizing device 60, a possibility that the material detection section 170 breaks down due to the heat of the heating section 130 can be reduced. Note that in the illustrated example, the direction perpendicular to the grooved face 112 is the Y-axis direction.

In the plasticizing device 60, the shortest distance D1 between the material detection section 170 and the material introduction portion 117 is smaller than the shortest distance D2 between the material detection section 170 and the outlet 15 of the hopper 10. Therefore, in the plasticizing device 60, as compared with the case where the distance D1 is larger than the distance D2, the amount of the material present in the supply passage 152 when the material detection section 170 detects material shortage can be reduced.

The material detection section 170 is a weight sensor or a pressure sensor, and may detect the presence or absence of the material by quantifying the residual amount. In that case, the control unit 50 may display the quantified information on an unillustrated display section. The quantified information is not particularly limited, but for example, "3 hours until production is stopped" or the like is exemplified.

Further, in the above-mentioned example, as the screw, the flat screw 110 whose size in the direction of the rotational axis RA is smaller than the size in the direction orthogonal to the direction of the rotational axis RA is used, however, an inline screw in a rod-like shape which is long in the direction of the rotational axis RA may be used in place of the flat screw 110.

2. Modifications of Injection Molding Apparatus
2.1. First Modification

Figure 7:
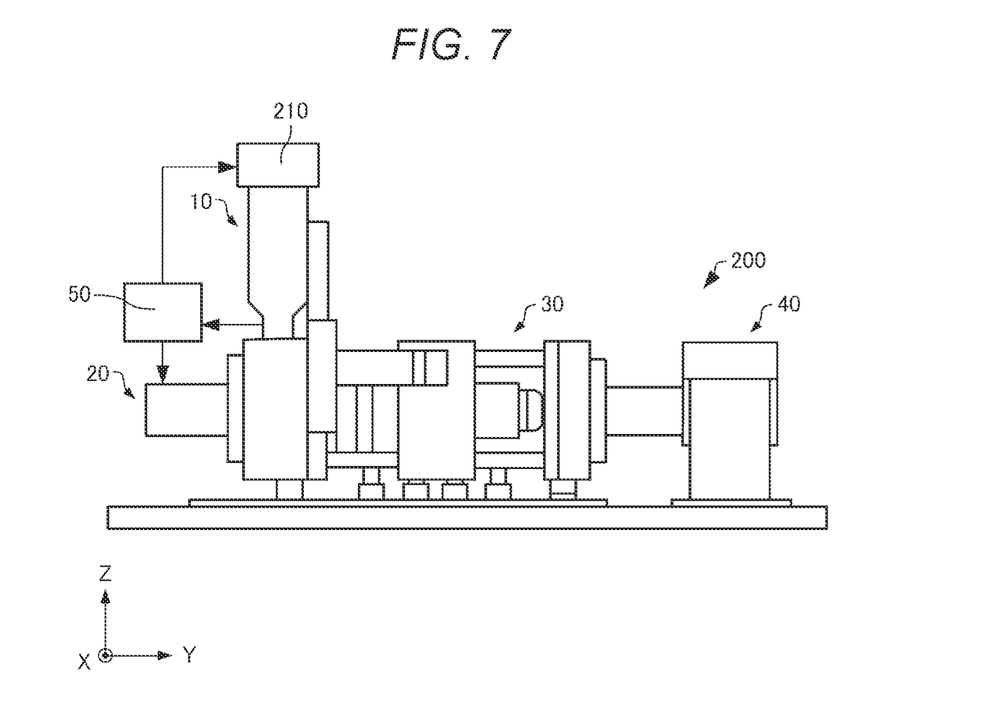
FIG. 7 is a cross-sectional view schematically showing an injection molding apparatus according to a modification of the present embodiment.

Next, an injection molding apparatus according to a first modification of the present embodiment will be described with reference to the drawing. FIG. 7 is a side view schematically showing an injection molding apparatus 200 according to the first modification of the present embodiment.

Hereinafter, in the injection molding apparatus 200 according to the first modification of the present embodiment, members having the same function as the constituent members of the injection molding apparatus 100 according to the present embodiment described above are denoted by the same reference numerals, and a detailed description thereof is omitted.

As shown in FIG. 7, the injection molding apparatus 200 is different from the injection molding apparatus 100 described above in that the plasticizing device 60 includes a supply device 210.

In the injection molding apparatus 200, when the material detection section 170 detects material shortage, the control unit 50 receives a signal from the material detection section 170 and controls the supply device 210 so as to supply the material to the hopper 10 after a preset purging time has elapsed. In this manner, in the injection molding apparatus 200, when the material detection section 170 detects material shortage, the material is automatically supplied to the hopper 10 by the supply device 210, and therefore, the labor of supplying the material to the hopper 10 can be omitted.

2.2. Second Modification

Next, an injection molding apparatus according to a second modification of the present embodiment will be described. In the injection molding apparatus 100 described above, as the material for forming the molded article, ABS in a pellet form is used.

On the other hand, in the injection molding apparatus according to the second modification of the present embodiment, as the material to be used in the plasticizing section 61, for example, a material containing any of various materials such as a material having thermoplasticity other than ABS, a metal material, and a ceramic material as a main material can be exemplified. Here, the "main material" means a material serving as a main component for forming the shape of the molded article and refers to a material whose content ratio is 50 wt % or more in the molded article. In the above-mentioned material, a material obtained by melting such a main material singly, and a material formed into a paste by melting some components contained together with the main material are included.

As the material having thermoplasticity, for example, a thermoplastic resin can be used. Examples of the thermoplastic resin include general-purpose engineering plastics such as polypropylene (PP), polyethylene (PE), polyacetal (POM), polyvinyl chloride (PVC), polyamide (PA), acrylonitrile-butadiene-styrene (ABS), polylactic acid (PLA), polyphenylene sulfide (PPS), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone (PEEK).

In the material having thermoplasticity, a pigment, a metal, a ceramic, or other than these, an additive such as a wax, a flame retardant, an antioxidant, or a heat stabilizer, or the like may be mixed. The material having thermoplasticity is plasticized and converted into a molten state by rotation of the flat screw 110 and heating by the heating section 130 in the plasticizing section 61. The molten material formed in this manner is cured by lowering the temperature after being ejected from the nozzle 80.

The material having thermoplasticity is desirably ejected from the nozzle 80 in a completely molten state by being heated to a temperature equal to or higher than the glass transition point thereof. For example, ABS has a glass transition point of about 120° C. and the temperature thereof when it is ejected from the nozzle 80 is desirably about 200° C.

In the plasticizing section 61, in place of the above-mentioned material having thermoplasticity, for example, a metal material may be used as the main material. In that case, it is desirable that a component that melts when forming the molten material is mixed in a powder material obtained by pulverizing the metal material into a powder form, and the resulting material is fed to the plasticizing section 61.

Examples of the metal material include single metals of magnesium (Mg), iron (Fe), cobalt (Co), chromium (Cr), aluminum (Al), titanium (Ti), copper (Cu), and nickel (Ni), or alloys containing one or more of these metals, and a maraging steel, stainless steel, cobalt-chromium-molybdenum, a titanium alloy, a nickel alloy, an aluminum alloy, a cobalt alloy, and a cobalt-chromium alloy.

In the plasticizing section 61, in place of the above-mentioned metal material, a ceramic material can be used as the main material. Examples of the ceramic material include oxide ceramics such as silicon dioxide, titanium dioxide, aluminum oxide, and zirconium oxide, non-oxide ceramics such as aluminum nitride.

The powder material of the metal material or the ceramic material to be fed to the hopper 10 may be a mixed material obtained by mixing multiple types of single metal powders or alloy powders or ceramic material powders. Further, the powder material of the metal material or the ceramic material may be coated with, for example, any of the above-mentioned thermoplastic resins or any other thermoplastic resin. In that case, the material may be configured to exhibit fluidity by melting the thermoplastic resin in the plasticizing section 61.

To the powder material of the metal material or the ceramic material to be fed to the hopper 10, for example, a solvent can also be added. Examples of the solvent include water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; tetra-alkyl ammonium acetates (for example, tetra-butyl ammonium acetate, etc.); and ionic liquids such as butyl carbitol acetate.

In addition thereto, for example, a binder may also be added to the powder material of the metal material or the ceramic material to be fed to the hopper 10. Examples of the binder include an acrylic resin, an epoxy resin, a silicone resin, a cellulosic resin, or another synthetic resin, or PLA (polylactic acid), PA (polyamide), PPS (polyphenylene sulfide), PEEK (polyether ether ketone), and other thermoplastic resins.

3. Three-Dimensional Shaping Apparatus

Figure 8:
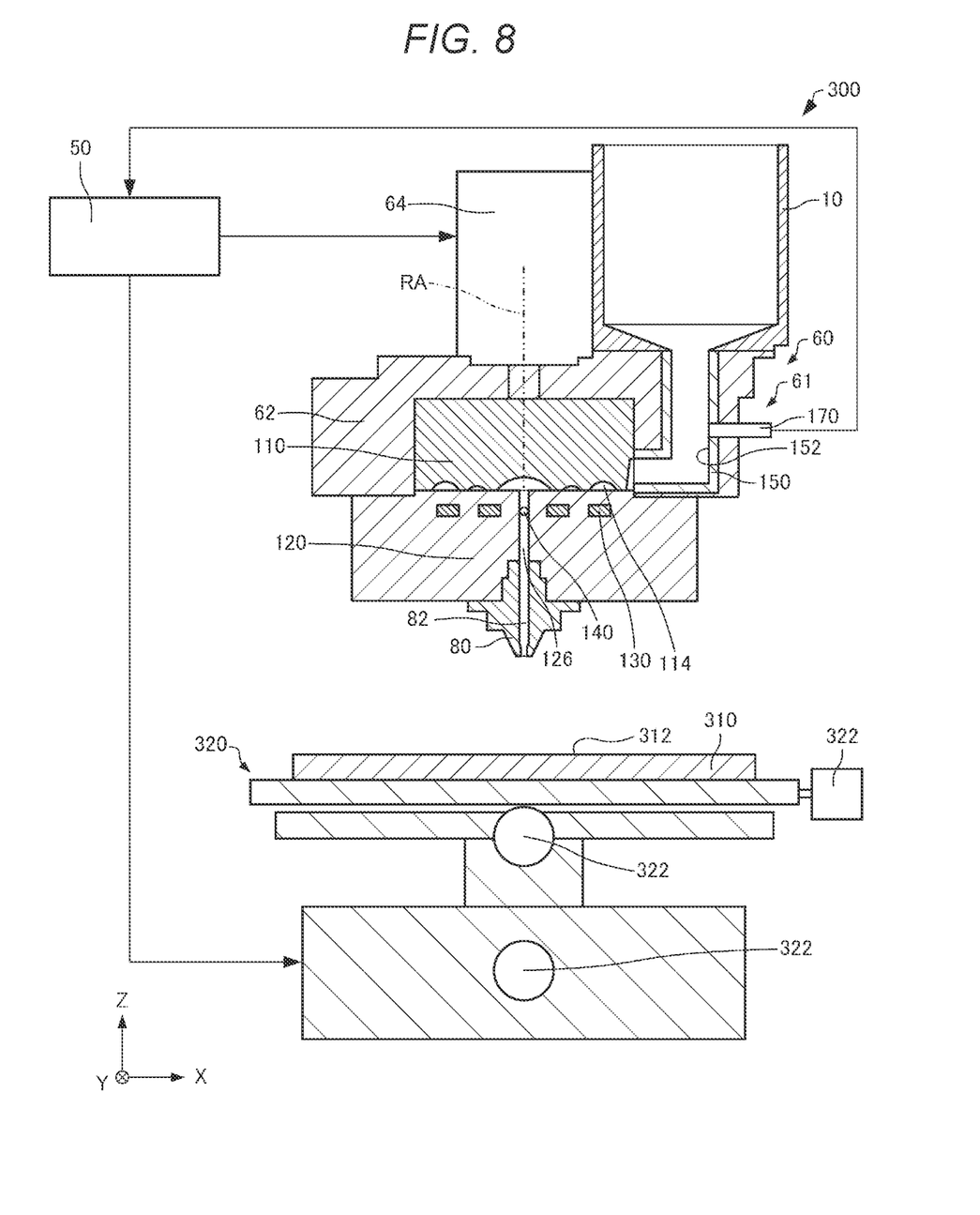
FIG. 8 is a cross-sectional view schematically showing a three-dimensional shaping apparatus according to the present embodiment.

Next, a three-dimensional shaping apparatus according to the present embodiment will be described with reference to the drawing. FIG. 8 is a side view schematically showing a three-dimensional shaping apparatus 300 according to the present embodiment.

The three-dimensional shaping apparatus 300 includes, for example, a hopper 10, a plasticizing device 60, a nozzle 80, a stage 310, a moving mechanism 320, and a control unit 50 as shown in FIG. 8. Although not shown in the drawing, the three-dimensional shaping apparatus 300 may further include the supply device 210 described above.

The plasticizing device 60 includes a plasticizing section 61, a passage defining section 150, and a material detection section 170. The plasticizing section 61 includes a screw case 62, a drive motor 64, a flat screw 110, a barrel 120, a heating section 130, and a check valve 140. In the illustrated example, the passage defining section 150 is provided in the screw case 62.

The nozzle 80 ejects a molten material supplied from the plasticizing device 60 to the stage 310. Specifically, the three-dimensional shaping apparatus 300 drives the moving mechanism 320 so as to change the relative position of the nozzle 80 and the stage 310 while ejecting the molten material to the stage 310 from the nozzle 80. By doing this, the three-dimensional shaping apparatus 300 shapes a three-dimensional shaped article having a desired shape on the stage 310.

The stage 310 is moved by the moving mechanism 320. The three-dimensional shaped article is formed at a shaping face 312 of the stage 310.

The moving mechanism 320 changes the relative position of the nozzle 80 and the stage 310. In the illustrated example, the moving mechanism 320 moves the stage 310 with respect to the nozzle 80. The moving mechanism 320 is constituted by, for example, a three-axis positioner for moving the stage 310 in the X-axis direction, Y-axis direction, and Z-axis direction by the driving forces of three motors 322. The motors 322 are controlled by the control unit 50.

The moving mechanism 320 may be configured to move the nozzle 80 without moving the stage 310. Alternatively, the moving mechanism 320 may be configured to move both the nozzle 80 and the stage 310.

The control unit 50 controls the moving mechanism 320 and the plasticizing device 60 based on shaping data obtained in advance so as to eject the molten material at a predetermined position on the stage 310 from the nozzle 80, whereby a three-dimensional shaped article is shaped.

The above-mentioned embodiments and modifications are examples, and the present disclosure is not limited thereto. For example, it is also possible to appropriately combine the respective embodiments and the respective modifications.

The present disclosure includes substantially the same configuration, for example, a configuration having the same function, method, and result, or a configuration having the same object and effect as the configuration described in the embodiments. Further, the present disclosure includes a configuration in which a part that is not essential in the configuration described in the embodiments is substituted. Further, the present disclosure includes a configuration having the same operational effect as the configuration described in the embodiments, or a configuration capable of achieving the same object as the configuration described in the embodiments. In addition, the present disclosure includes a configuration in which a known technique is added to the configuration described in the embodiments.

From the above-mentioned embodiments, the following contents are derived.

One aspect of a plasticizing device includes a passage defining section that is coupled to a hopper which stores a material and that defines a supply passage to which the material is supplied from the hopper, a plasticizing section that includes an introduction portion which communicates with the supply passage, and a screw, and that plasticizes the material supplied from the introduction portion by rotation of the screw to form a molten material, and a material detection section that detects the presence or absence of the material in the supply passage.

According to the plasticizing device, as compared with the case where the material detection section detects the presence or absence of the material in the hopper, the amount of the material remaining in the supply passage can be reduced when the material is exchanged. Therefore, the amount of the material to be discarded can be reduced.

In one aspect of the plasticizing device, the device may further include a control unit, and the control unit may control the screw so as to stop the rotation of the screw when the material detection section detects material shortage.

According to the plasticizing device, failure due to a short shot and breakage of the device due to no-load running can be prevented.

In one aspect of the plasticizing device, the device may further include a supply device that supplies the material to the hopper, and a control unit, and the control unit may control the supply device so as to supply the material to the hopper when the material detection section detects material shortage.

According to the plasticizing device, when the material detection section detects material shortage, the material is automatically supplied to the hopper by the supply device, and therefore, the labor of supplying the material to the hopper can be omitted.

In one aspect of the plasticizing device, the screw may have a grooved face provided with a groove, and the plasticizing section may include a barrel that has an opposed face opposed to the grooved face and that is provided with a communication hole at the opposed face.

According to the plasticizing device, the material can be supplied to the groove from the supply passage.

In one aspect of the plasticizing device, the plasticizing section may include a heating section that heats the material supplied between the screw and the barrel, and a cooling section that cools an outer circumference of at least one of the screw and the barrel, and the material detection section may be provided at a position closer to the cooling section than to the heating section.

According to the plasticizing device, as compared with the case where the material detection section is provided at a position closer to the heating section than to the cooling section, a possibility that the material detection section breaks down due to the heat of the heating section can be reduced.

In one aspect of the plasticizing device, the passage defining section may be a case that houses the screw, the heating section may be provided in the barrel, the cooling section may be provided in the case, and when viewed from a cross section, the material detection section, the supply passage, and the cooling section may be arranged in this order from the top.

According to the plasticizing device, as compared with the case where the material detection section, the supply passage, and the cooling section are not arranged in this order, a possibility that the material in the supply passage is melted by the heat of the heating section can be reduced.

In one aspect of the plasticizing device, when viewed from a direction perpendicular to the grooved face, the heating section, the cooling section, and the material detection section may be provided in this order from the center of the barrel to the outside.

According to the plasticizing device, a possibility that the material detection section breaks down due to the heat of the heating section can be reduced.

In one aspect of the plasticizing device, a shortest distance between the material detection section and the introduction portion may be smaller than a shortest distance between the material detection section and an outlet for the material of the hopper.

According to the plasticizing device, the amount of the material present in the supply passage when the material detection section detects material shortage can be reduced.

One aspect of an injection molding apparatus includes a plasticizing device that plasticizes a material to form a molten material, and a nozzle that injects the molten material supplied from the plasticizing device to a mold, wherein the plasticizing device includes a passage defining section that is coupled to a hopper which stores the material and that defines a supply passage to which the material is supplied from the hopper, a plasticizing section that includes an introduction portion which communicates with the supply passage, and a screw, and that plasticizes the material supplied from the supply passage by rotation of the screw to form the molten material, and a material detection section that detects the presence or absence of the material in the supply passage.

One aspect of a three-dimensional shaping apparatus is a three-dimensional shaping apparatus that shapes a three-dimensional shaped article, and includes a plasticizing device that plasticizes a material to form a molten material, and a nozzle that ejects the molten material supplied from the plasticizing device to a stage, wherein the plasticizing device includes a passage defining section that is coupled to a hopper which stores the material and that defines a supply passage to which the material is supplied from the hopper, a plasticizing section that includes an introduction portion which communicates with the supply passage, and a screw, and that plasticizes the material supplied from the supply passage by rotation of the screw to form the molten material, and a material detection section that detects the presence or absence of the material in the supply passage.

What is claimed is:

1. A plasticizing device, comprising:
   a passage defining frame that is coupled to a hopper which stores a material and that defines a supply passage to which the material is supplied from the hopper, the supply passage being elongated in an axial direction;
   a plasticizing assembly that includes a screw with an introduction portion, the introduction portion communicating with the supply passage, the plasticizing assembly being configured to plasticize the material supplied from the introduction portion by rotation of the screw around a rotation axis to form a molten material; and
   a sensor configured to sense in a direction along the rotation axis to detect a presence or absence of the material in the supply passage,
   wherein a hole communicating with the supply passage is formed in the passage defining frame, and the sensor is disposed in the hole, and
   the screw and the sensor are laterally shifted from each other when viewed along the rotation axis.

2. The plasticizing device according to claim 1, further comprising a controller configured to control operation of the screw,
   wherein the controller is configured to stop the rotation of the screw when the sensor detects material shortage.

3. The plasticizing device according to claim 1, further comprising:
   a material store that supplies the material to the hopper; and
   a controller, wherein
   the controller is configured to control the material store so as to supply the material to the hopper when the sensor detects material shortage.

4. The plasticizing device according to claim 1, wherein the screw has a grooved face provided with a groove, and
   the plasticizing assembly includes a barrel that has an opposed face opposed to the grooved face and that is provided with a communication hole at the opposed face.

5. The plasticizing device according to claim 4, wherein the plasticizing assembly includes:
   a heater configured to heat the material supplied between the screw and the barrel; and
   a cooler configured to cool an outer circumference of at least one of the screw and the barrel, and
   the sensor is provided at a position closer to the cooler than the heater.

6. The plasticizing device according to claim 5, wherein the passage defining frame is a case that houses the screw, the heater is provided in the barrel,
   the cooler is provided in the case, and
   when viewed in cross section along the axial direction of the supply passage, the sensor, the supply passage, and the cooler are arranged in this order from a top toward a bottom of the passage defining frame.

7. The plasticizing device according to claim 6, wherein when viewed from a direction perpendicular to the grooved face, the heater, the cooler, and the sensor are provided in this order from a center of the barrel toward an outside of the plasticizing device.

8. The plasticizing device according to claim 1, wherein a shortest distance between the sensor and the introduction portion is smaller than a shortest distance between the sensor and an outlet for the material of the hopper.

9. The plasticizing device according to claim 1, wherein the plasticizing assembly includes a cooler that cools an outer circumference of the screw, and
when viewed along the axial direction, the cooler is provided along an outer circumference of the supply passage.

10. The plasticizing device according to claim 4, further comprising a controller configured to control operation of the screw,
wherein the controller is configured to stop the rotation of the screw after throwing out the material remaining in the communication hole when the sensor detects material shortage.

11. The plasticizing device according to claim 2, wherein the plasticizing assembly includes a heater, and
the controller is configured to control the heater so as to keep driving of the heater even if the sensor detects material shortage.

12. The plasticizing device according to claim 1, wherein the sensor is configured to sense in the direction along a longitudinal direction of the hole.

13. An injection molding apparatus, comprising:
a plasticizing device configured to plasticize a material to form a molten material; and
a nozzle configured to inject the molten material supplied from the plasticizing device to a mold, wherein
the plasticizing device includes:
 a passage defining frame that is coupled to a hopper which stores the material and that defines a supply passage to which the material is supplied from the hopper, the supply passage being elongated in an axial direction;
 a plasticizing assembly that includes a screw with an introduction portion, the introduction portion communicating with the supply passage, the plasticizing assembly being configured to plasticize the material supplied from the supply passage by rotation of the screw around a rotation axis to form the molten material; and
 a sensor configured to sense in a direction along the rotation axis to detect a presence or absence of the material in the supply passage, and
wherein a hole communicating with the supply passage is formed in the passage defining frame, and the sensor is disposed in the hole, and
the screw and the sensor are laterally shifted from each other when viewed along the rotation axis.

14. The injection molding apparatus according to claim 13, wherein
the sensor is configured to sense in the direction along a longitudinal direction of the hole.

15. A three-dimensional shaping apparatus that shapes a three-dimensional shaped article, comprising:
a plasticizing device configured to plasticize a material to form a molten material; and
a nozzle configured to eject the molten material supplied from the plasticizing device to a stage, wherein
the plasticizing device includes:
 a passage defining frame that is coupled to a hopper which stores the material and that defines a supply passage to which the material is supplied from the hopper, the supply passage being elongated in an axial direction;
 a plasticizing assembly that includes a screw with an introduction portion, the introduction portion communicating with the supply passage, the plasticizing assembly being configured to plasticize the material supplied from the supply passage by rotation of the screw around a rotation axis to form the molten material; and
 a sensor configured to sense in a direction along the rotation axis to detect a presence or absence of the material in the supply passage,
a hole communicating with the supply passage is formed in the passage defining frame, and the sensor is disposed in the hole, and
the screw and the sensor are laterally shifted from each other when viewed along the rotation axis.

16. The three-dimensional shaping apparatus according to claim 15, wherein
the sensor is configured to sense in the direction along a longitudinal direction of the hole.

* * * * *